No. 836,513. PATENTED NOV. 20, 1906.
PAUL LEBAUDY & PIERRE LEBAUDY.
AIR SHIP.
APPLICATION FILED FEB. 11, 1903.
12 SHEETS—SHEET 1.
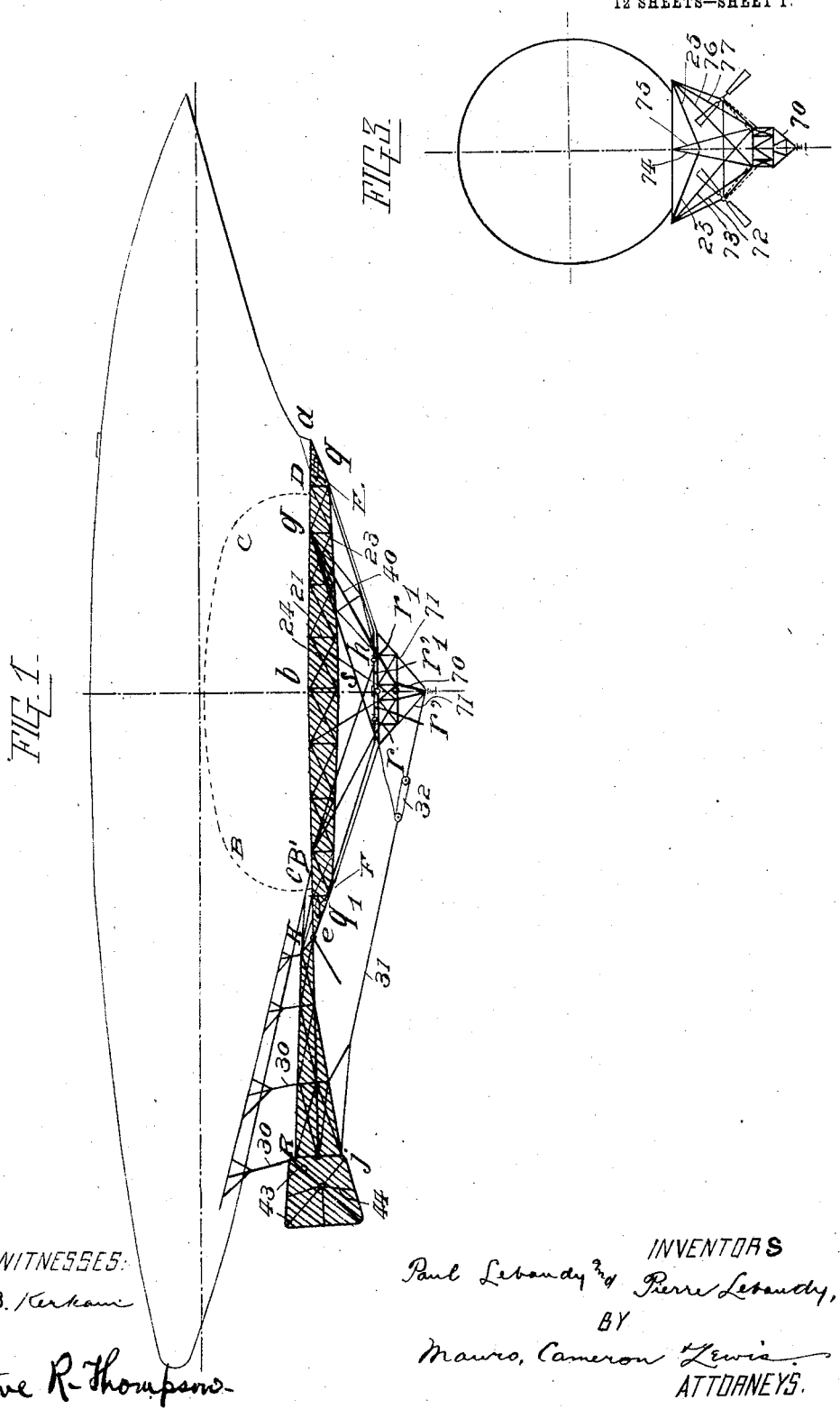
WITNESSES:
INVENTORS
Paul Lebaudy
Pierre Lebaudy,
BY
Mauro, Cameron & Lewis
ATTORNEYS.

No. 836,513. PATENTED NOV. 20, 1906.
PAUL LEBAUDY & PIERRE LEBAUDY.
AIR SHIP.
APPLICATION FILED FEB. 11, 1903.
12 SHEETS—SHEET 2.
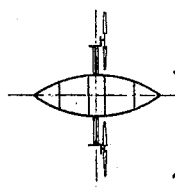
WITNESSES:
INVENTORS
Paul Lebaudy
Pierre Lebaudy
BY
Mauro, Cameron & Lewis
ATTORNEYS.

No. 836,513. PATENTED NOV. 20, 1906.
PAUL LEBAUDY & PIERRE LEBAUDY.
AIR SHIP.
APPLICATION FILED FEB. 11, 1903.
12 SHEETS—SHEET 3.
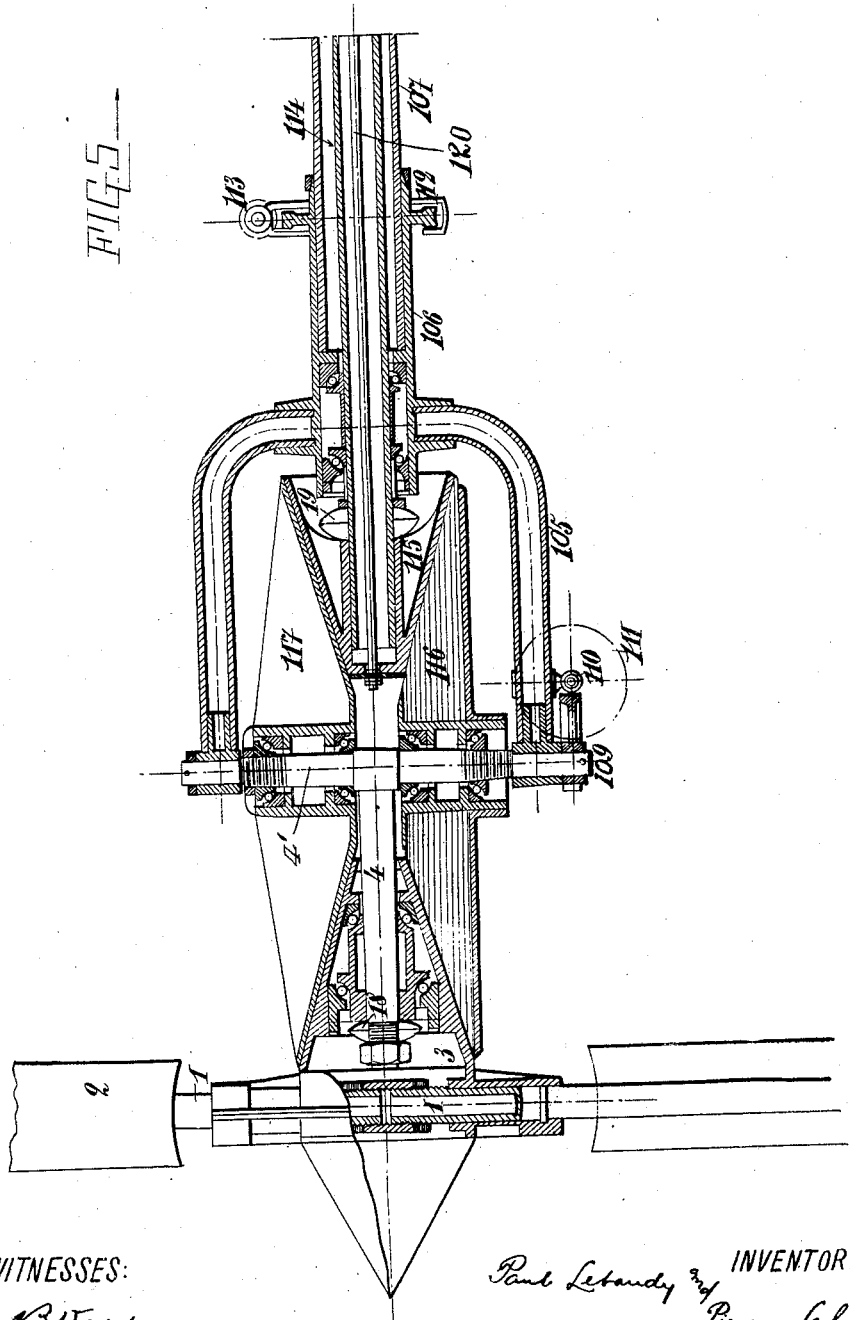

No. 836,513. PATENTED NOV. 20, 1906.
PAUL LEBAUDY & PIERRE LEBAUDY.
AIR SHIP.
APPLICATION FILED FEB. 11, 1903.
12 SHEETS—SHEET 4.
FIG. 5.ª
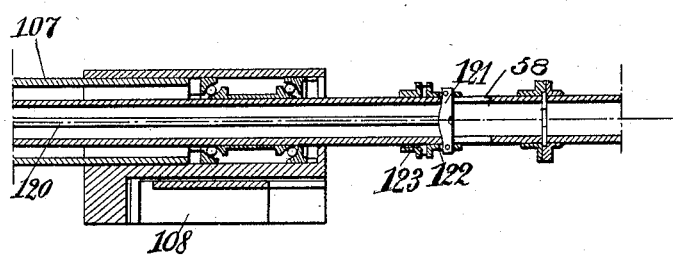
FIG. 6.ª
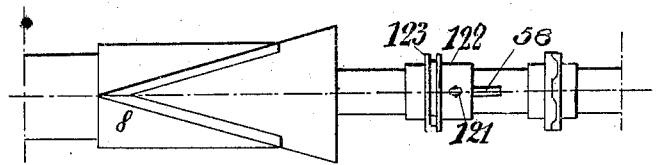

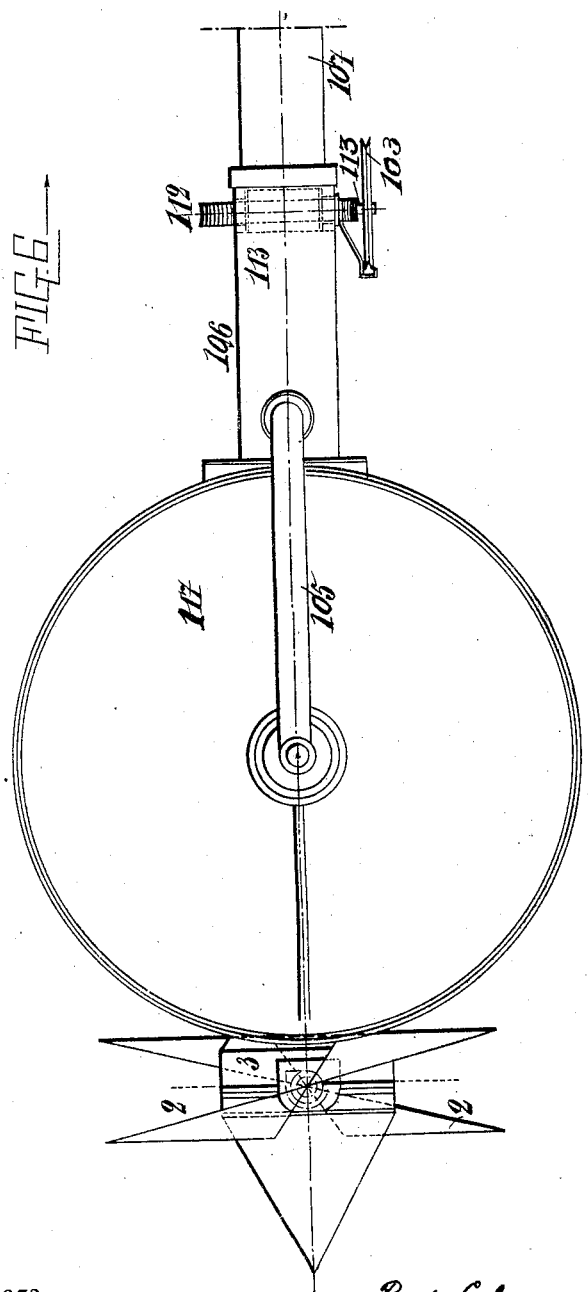

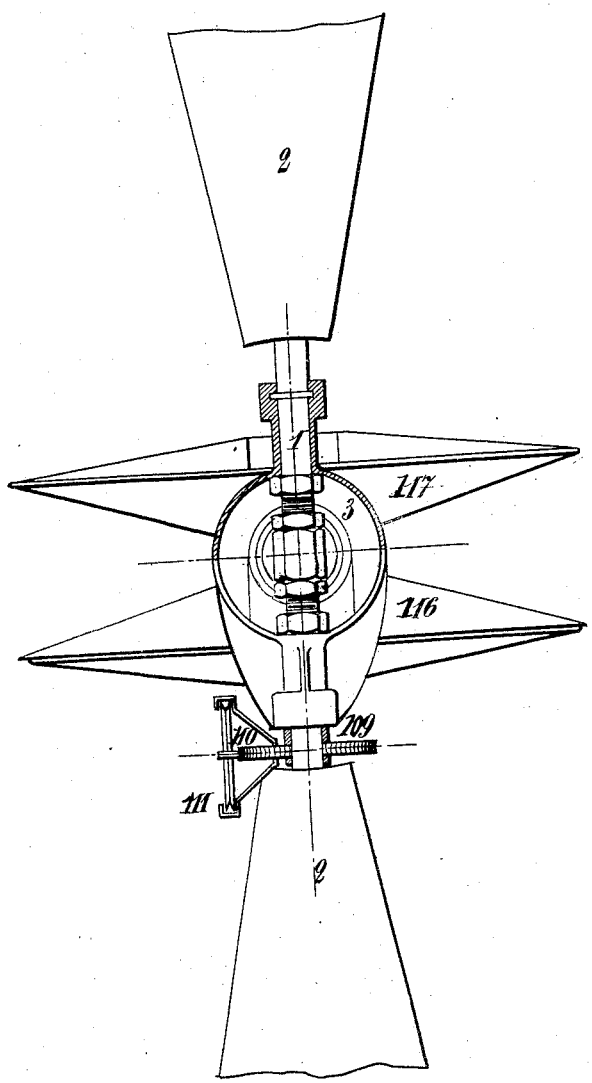

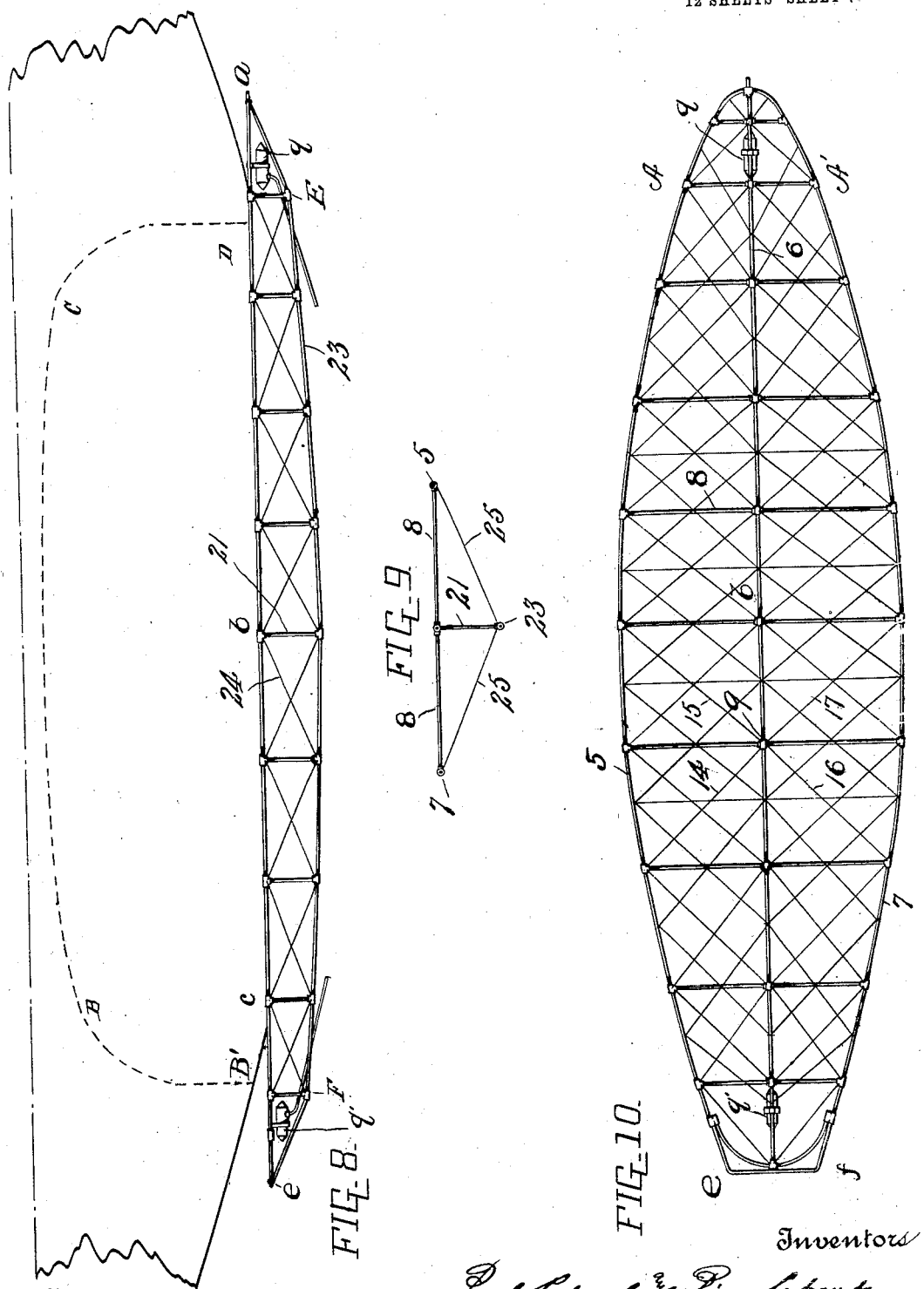

No. 836,513. PATENTED NOV. 20, 1906.
PAUL LEBAUDY & PIERRE LEBAUDY.
AIR SHIP.
APPLICATION FILED FEB. 11, 1903.
12 SHEETS—SHEET 8.
FIG.11.
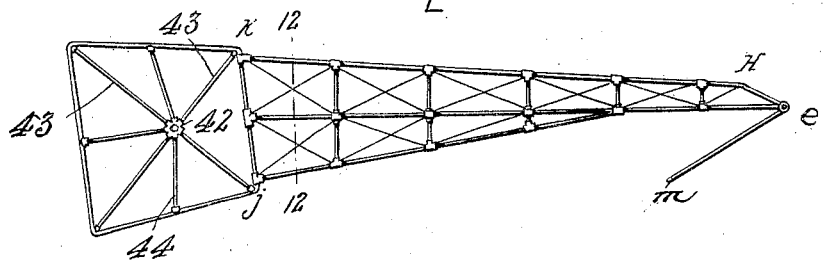
FIG.12.
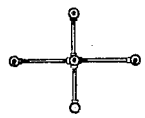
FIG.13.
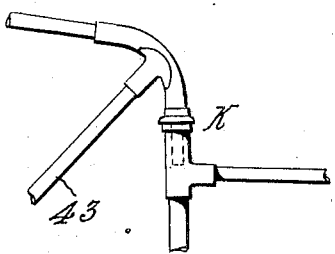
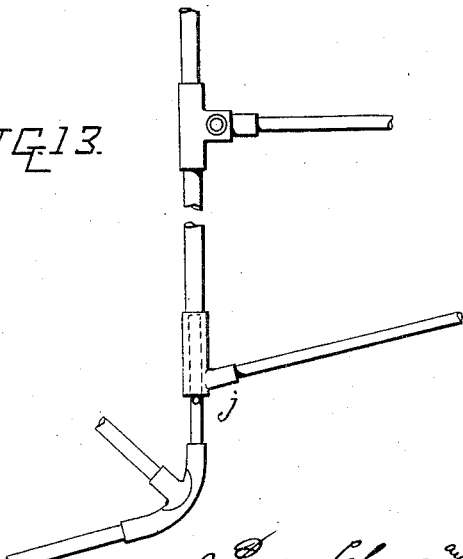
Witnesses
Chas. K. Davis.
Wm. B. Herkam
Inventors.
Paul Lebaudy and Pierre Lebaudy,
by Mauro, Cameron &c.,
Attorneys No. 836,513. PATENTED NOV. 20, 1906.
PAUL LEBAUDY & PIERRE LEBAUDY.
AIR SHIP.
APPLICATION FILED FEB. 11, 1903.

12 SHEETS—SHEET 9.

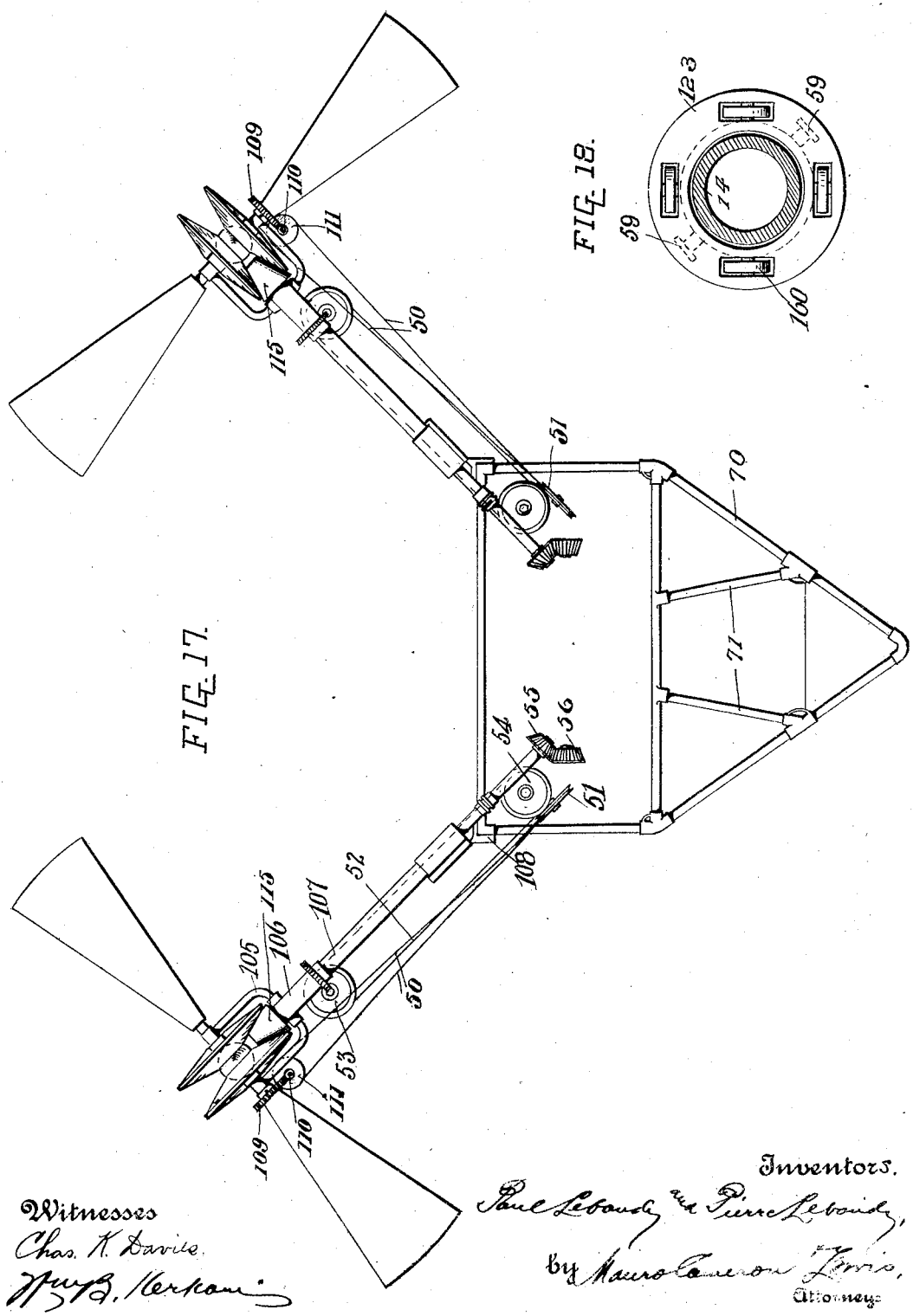

No. 836,513.
PATENTED NOV. 20, 1906.
PAUL LEBAUDY & PIERRE LEBAUDY.
AIR SHIP.
APPLICATION FILED FEB. 11, 1903.
12 SHEETS—SHEET 11.
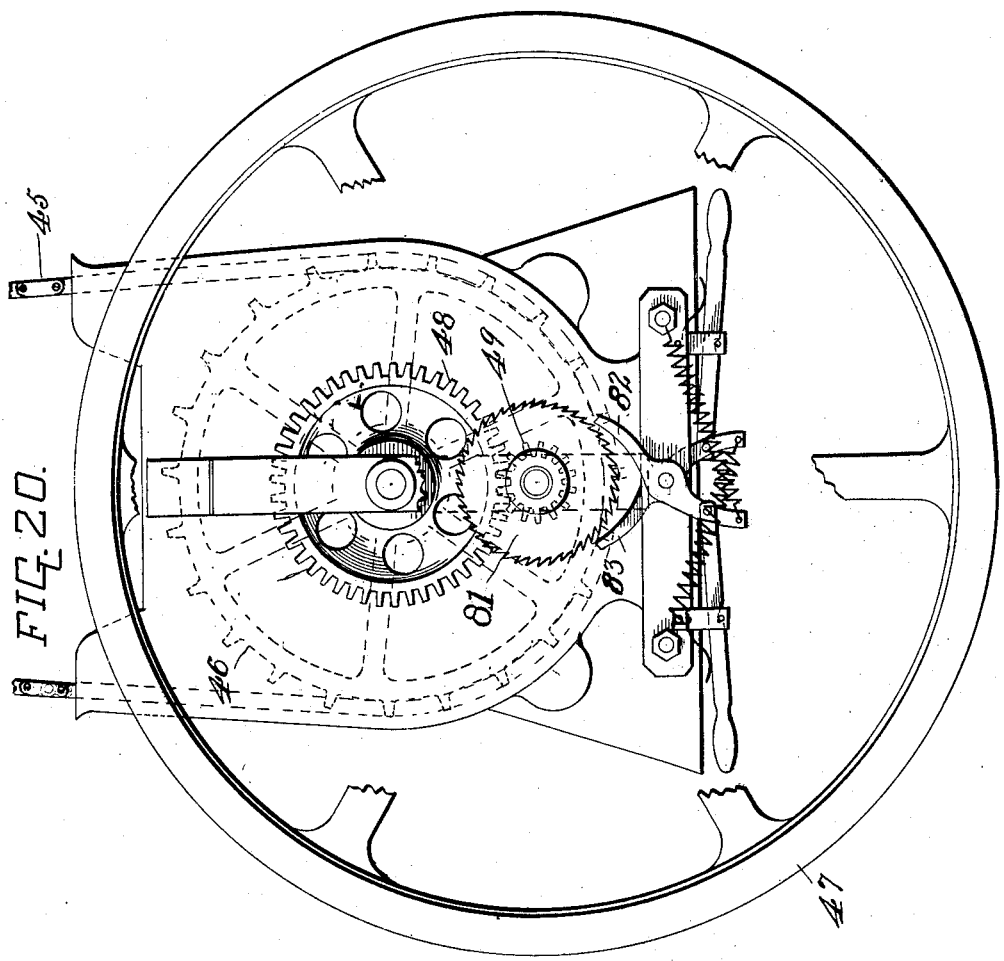
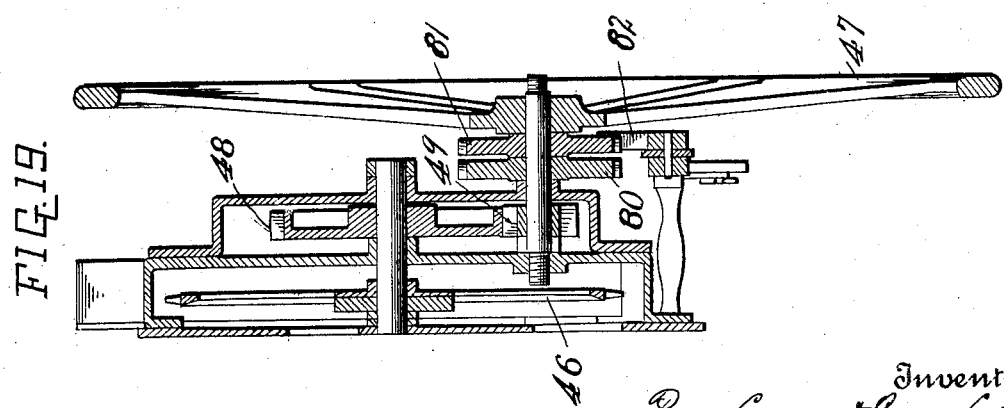
Witnesses
Inventors
Paul Lebaudy Pierre Lebaudy
By Mauro, Cameron & Lewis
Attorneys

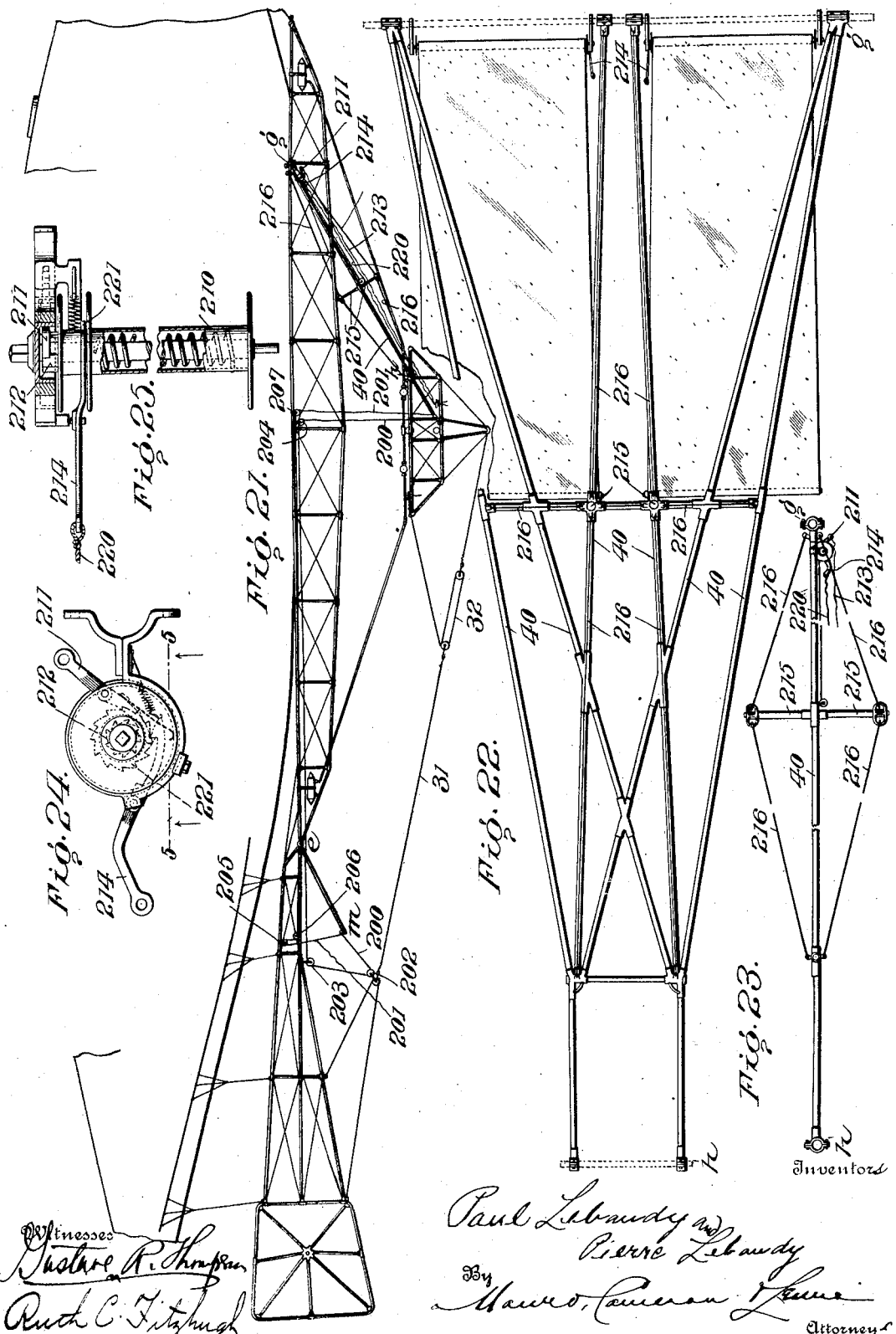

UNITED STATES PATENT OFFICE.

PAUL LEBAUDY AND PIERRE LEBAUDY, OF PARIS, FRANCE.

AIR-SHIP.

No. 836,513.      Specification of Letters Patent.      Patented Nov. 20, 1906.

Application filed February 11, 1903. Serial No. 142,936.

*To all whom it may concern:*

Be it known that we, PAUL LEBAUDY and PIERRE LEBAUDY, citizens of the Republic of France, and residents of Paris, France, have invented a new and useful Improvement in or Relating to Air-Ships, which improvement is fully set forth in the following specification.

This invention relates to a steerable airship designed so as to make it as strong and as steady as possible and at the same time easily steerable.

In order to make the invention more easily understood, it will be described with reference to the accompanying drawings, illustrating, by way of example, an air-ship or balloon designed in accordance with this invention.

Figure 14:
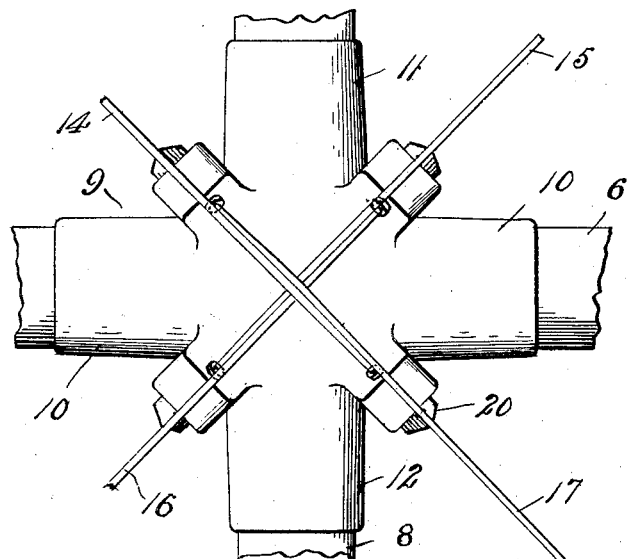
Figure 15:
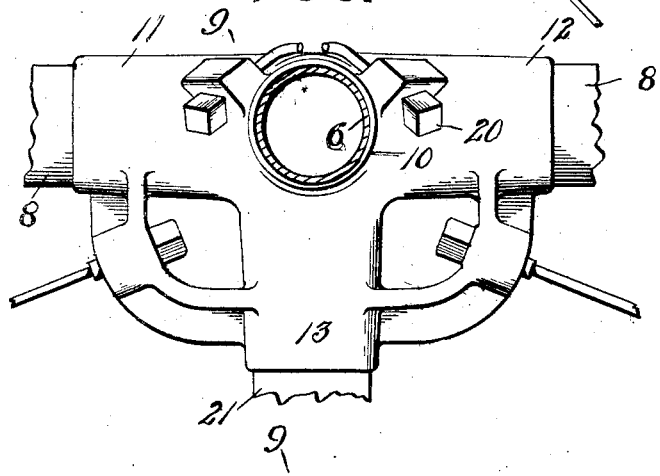
Figure 16:
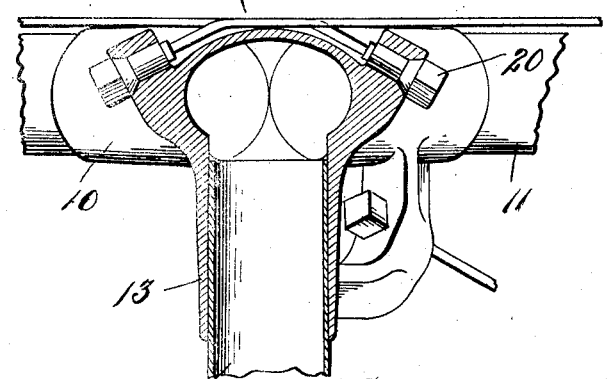

Figure 1 shows the air-ship in longitudinal elevation. Fig. 2 is a view from below with the car and its supporting connections omitted. Fig. 3 is an end view. Fig. 4 shows the car in plan on the same scale. Figs. 5, 5ᵃ together are a sectional view. Figs. 6, 6ᵃ together are a plan view, and Fig. 7 an end view, of one of the propellers and its operating connections. Fig. 8 is a side elevation of part of the balloon, showing also the frames of the principal horizontal and vertical aeroplanes. Fig. 9 is an end view, and Fig. 10 a bottom view, of said frames. Fig. 11 is a side view, and Fig. 12 a transverse section on line 12, Fig. 11, of the frames of the rear horizontal and vertical aeroplanes. Fig. 13 is a detail of the rudder. Figs. 14, 15, and 16 are detail views of one of the couplings. Fig. 17 is an end elevation of the car and propellers. Fig. 18 is a detail of part of the propeller-operating mechanism. Fig. 19 is a section, and Fig. 20 an elevation, of the rudder-operating means. Fig. 21 is an elevation of a portion of the air-ship, parts of the connections to the car being omitted to permit other parts to be clearly shown. Fig. 22 is a plan, and Fig. 23 a side elevation, of a frame which connects the car and the framework of the aeroplanes above; and Figs. 24 and 25 are details of the rollers for the sail.

The stability and the possibility of steering the balloon in both directions (horizontal and vertical) are secured by the use of four kinds of plane surfaces or aeroplanes:

1. Horizontal aeroplanes, (or nearly so,) by means of which stability in longitudinal direction is insured, and all pitching is avoided. The principal horizontal aeroplane is fixed, while the position of others can be easily adjusted before sailing or between runs.

2. Fixed vertical aeroplanes arranged approximately in the axial plane of the apparatus, by means of which stability during the flight is insured and which prevent the balloon from deviating from the direction which has been given to it. Its lateral stability is also insured by the vertical aeroplanes in conjunction with the horizontal aeroplanes, thus preventing any rolling.

3. One or more aeroplanes or rudders movable about horizontal axes, which can be inclined during the flight to a greater or less extent relatively to the horizontal line, thus enabling the balloon to be steered in the vertical direction.

4. One or more aeroplanes movable about vertical or nearly vertical axes and constituting an ordinary rudder, enabling the balloon to be steered in the horizontal direction.

These four kinds of aeroplanes are arranged as will now be described with reference to Figs. 1, 2, 3, 4, 8, 9, 10, 11, and 12. The first and principal fixed aeroplane e A A' f, which is horizontal, or nearly so, is obtained by omitting for a certain length and corresponding width what may be called the "belly" of the somewhat cigar-shaped balloon-body and substituting a flat plane therefor. This aeroplane may be either perfectly horizontal and quite flat or, still better, it may be made slightly inclined relatively to the horizontal line. This arrangement enables a portion of the propelling power to be utilized for causing the ship to rise. This aeroplane, owing to its relation to the balloon, is of an elliptical outline, Figs. 2 and 10. The aeroplanes may be formed in various ways; but it is preferable to construct them of frames of steel tubes connected together and strengthened by ties formed of steel wires provided with stretching devices. For example, the frames of the principal horizontal aeroplane is composed of longitudinal tubes 5, 6, and 7 and transverse tubes 8. At the points where the tubes intersect or cross each other they are secured together by suitable coupling-pieces. Figs. 14, 15, and 16 show in detail one of these couplings 9 used at the middle of the frame, where two of the tubes 8 are connected to tube 6. The latter passes entirely through sockets 10 of the coupling, and the inner ends of tubes 8 8 are secured in sockets 11 12, respectively. A depending socket 13 receives the end of one of the vertical pipes of the frame of the principal vertical plane, as described hereinafter. The ends of four steel wires 14, 15, 16, and 17 are secured to the coupling 19, each by a nut 20, engaging a screw-thread on the end of the wire. The latter may be tightened by turning the nut. These four wires radiate from the coupling and are connected to the outer longitudinal tubes 5 and 7, as shown in Figs. 2 and 10. They cross other similar wires and form in the frame a network having large meshes. The envelop of the balloon proper bears against the frame of the principal horizontal aeroplane, and the internal pressure causes it to slightly bulge or protrude into the meshes of the frame, thus assisting in preventing shifting of the envelop on the frame during flight. It is advisable to insert between the envelop and the metal parts of the aeroplanes a lining of some fabric strengthened at the points of intersection of the wires and tubes, so as to prevent the envelop of the balloon from being worn through and the gas from escaping. In order that the uneven surface produced by the envelop and the lining protruding between the tubes and the wires should not impede the flight, a fabric (shown by cross-lines on Fig. 2) is placed underneath said tubes and wires and forms a stretched flat surface, offering practically no resistance to the movement in the air. If the motor used be a thermic motor, the fabric in question as well as that forming the lining should be made of some non-combustible material. An auxiliary air-charged chamber or balloon B' B C D is located within the main balloon and inclosed along its under side by the under part of that portion of the envelop of the main balloon which bears upon the frame, as already pointed out. In this way the hydrogen in the main balloon is isolated from the thermic motor along the whole surface of the main horizontal aeroplane by four layers of fabric, two of which are non-combustible, and by the body of air in the auxiliary balloon.

2. The first and principal fixed vertical aeroplane $a\ b\ c\ F\ E$ is arranged in the longitudinal axis of the steerable balloon. It is also constituted by non-combustible fabric (cross-lines, Fig. 1) vertically stretched on a frame of steel tubes and wires. 21 designates vertical tubes secured at their upper end in sockets 13, Figs. 15 and 16, of couplings such as already described. 23 is a longitudinal tube to which the lower ends of tubes 21 are secured, and 24 represents cross-wires. Oblique ties or wires 25, Fig. 3, extend from the outer edges of the horizontal aeroplane-frame to the lower edge of the vertical aeroplane-frame. A strong girder is thus obtained, whereby the deformation of both kinds of aeroplanes is prevented and at the same time a strong frame formed which is utilized for suspending the car and preventing the envelop from altering its shape under the influence of the weight of the car. The envelop of the balloon is itself fixed to the elliptical edges of the frame thus produced by a network of crossed wires or the like, and it is longer than the principal aeroplanes, which, as already stated, only extend along its belly. There remain in front and at the back of said frame two parts of the envelop which are more or less forcibly raised by the contained gas, so that the upper curve of the envelop is relatively slight and the main body of the balloon is inclosed between two almost parallel surfaces formed one by the aeroplanes extending along the belly and the other by the slightly-convex upper portion of the envelop. This arrangement is very favorable to stability during flight.

Besides the two principal fixed aeroplanes just described there are the following: The principal horizontal aeroplane terminates at its rear in a straight transverse line $e\ f$, formed by a tube, and to this tube is hinged a very light metallic frame of steel tubes and wires (constructed in a manner similar to the frame already described) and comprising horizontal and vertical frames intersecting along a common axis. On each of the frames is stretched a canvas, (shown by cross-lines, Figs. 1 and 2,) so that the covered vertical frame forms an extension or continuation $e\ H\ K\ J$ of the fixed vertical aeroplane under the belly of the balloon and assists in keeping the balloon steady in steering and in preventing rolling. The covered horizontal frame forms in the same way a continuation $e\ f\ G\ G'$ of the large aeroplane of the belly. The frame in question being hinged to the rear transverse tube $e\ f$ of the fixed aeroplanes, the second horizontal aeroplane may be placed at any suitable angle, said angle being adjusted and determined during the trials of the apparatus, so that said horizontal aeroplane can be inclined upwardly or downwardly from the principal horizontal plane, and be used to correct any unexpected effects due to the action of the air upon surfaces of the air-ship. The body of the balloon proper is constituted by a cigar-shaped envelop, the tapering front end of which is shorter than the tapering rear end, so that the major portion of the framework is nearer the front end of the balloon, this being, as is well known, a very favorable condition. The result is that the envelop does not, as already stated, rise abnormally at its front part, which is, relatively speaking, short. To prevent abnormal relative elevation of the rear longer end of the envelop, which, if it were to rise too much, would produce in the curve of the back and in the sides of the envelop bends, which would be injurious in many respects and would also produce excessive tension at the points of attachment of the envelop to the back of the main large horizontal aeroplane, the back portion of the envelop is connected to the car. If, however, this part were connected directly to the car, the too long and too horizontal suspension-cables would oscillate about the car as the fixed point and would not prevent the rear part of the envelop from rising. In order to do away with this drawback, the attachment is effected through the frame of the rear vertical aeroplane already described. Cables, wires, or the like 30, having branched connection at their upper ends with the covering of the balloon, are connected at their lower ends with the upper edge of the frame of the rear vertical frame. The lower edge of said frame is in turn connected with the car by a cable 31, which may be lengthened or shortened by suitable tackle 32, leading to the car. By varying the length of the cables connecting the frame on the one hand to the car and on the other hand to the back portion of the envelop the position or, at least, the inclination of the rear horizontal aeroplane relative to the horizontal line may be altered by causing it to move about the rear horizontal tube $ef$, though the length of cables 30 cannot readily be varied during flight, but only beforehand. In certain cases where the adjustment of the other aeroplanes about to be described proves insufficient to give the desired effect the rear aeroplanes may be adjusted about axis $ef$ during flight by operating the tackle 32 from the car. The hinge $ef$ serves also another purpose. If the pressure of gas in the interior of the envelop varies beyond the limits fixed by the adjustment of the safety-valves, escape of gas and air from the envelop and the compensating balloon will take place and the result of these variations will be that the back of the envelop is brought more or less near the theoretical position corresponding to the exact pattern of the balloon. If the pressure were to vary without there being a hinge-joint between the frame of the belly and the lighter frame at the back, the connection of the two frames would in time be injured and even break; but owing to the use of the hinge-joint yielding to the slight movements without producing any strain on the thin metal tubes such unpleasant consequences are avoided.

3. The aeroplanes or rudders ordinarily movable during the flight will be now described and first of all the rudder movable on a horizontal axis. It has the shape of a trapezoid $e\ m\ n\ f$, and its hinge-pin is constituted by the horizontal rear tube $ef$. It is widest at the end farthest from that tube for the purpose of having the largest surface in the most efficient position. It is constituted by a frame of tubes and steel wires, on which is stretched a double canvas or the like. (Shown by cross-lines, Fig. 2.) Two cables 200 201, Fig. 21, serve to raise or to lower it from the car. Cable 200, for lowering the rudder, passes over pulleys 202 203 204 down to the car, while cable 201, for raising the rudder, passes over pulleys 205 206 207 down to the car. When this rudder is lowered, the air passing under the large horizontal aeroplane strikes it, and the whole of the steerable balloon is raised at the back and downwardly inclined in front, so that the balloon can descend in an oblique direction without the necessity of discharging gas. When it is desired to ascend instead of descend, the rudder in question is raised and its coöperation with the other fixed and movable aeroplanes causes the front part of the balloon to be raised, so that the air-ship ascends. If it is necessary to ascend quickly, a canvas or sail, generally carried rolled up at $g$, Fig. 1, is unfurled along the under side of a series of six tubes 40, connecting the front of the large frame and the car between the points $g$ and $h$. In this way an inclined surface is obtained in front, which assists the ascension. This sail constitutes, in effect, a second areoplane of variable size movable during flight. In this way the balloon can be steered vertically during its flight. This sail is preferably divided into two sections, as shown in Fig. 22, adapted to be spread along tubes 40 upon opposite sides, respectively, of the main vertical plane. Each section of the said sail is wound upon a spring-roller 210, Figs. 24 and 25, analogous to the well-known window-shade spring-actuated roller, except that there is a pawl and ratchet which controls the unrolling as well as the rolling up of the curtain. Referring particularly to Figs. 24 and 25, pawl 211, normally held in engagement with ratchet-wheel 212, may be disengaged therefrom by pulling upon cord 213, Fig. 21, leading to the car, permitting unrolling of the sail. Pawl 214, normally held in engagement with ratchet-wheel 221, may be disengaged therefrom by pulling upon cord 220, Fig. 21, to release roller 210, permitting the spring of the latter to rotate the roller to wind up the sail. The rigid frame composed of the six tubes 40, Figs 22 and 23, is braced and strengthened by laterally-projecting tubes 215 and stay-wires 216, extending from the ends of said tubes in different directions to the joints of said frame.

4. Finally the fourth kind of aeroplane is represented by an ordinary vertically-disposed rudder $jk$, also constituted by a frame of steel tubes and wires covered with two stretched pieces of canvas. This frame is hinged to the end of the frame of the rear vertical aeroplane, so that when it is in an oblique position the air deflected by this blade strikes the vertical rudder, and so steers the balloon. The fact of its being arranged so very far at the back also renders this rudder highly efficient. It is operated by two cords or wires 41, attached to the extremities of a tube 42, passing at a right angle through the middle of the rudder and secured to the ends and sides of the frame by wires 43 44. Said wires 41 pass to the outer corners of the horizontal member of the back frame and then descend to the car, where they are attached to a chain 45, Figs. 19 and 20, passing round a toothed wheel 46, controlled by a hand-wheel 47 and toothed gearing 48 49 and secured in any desired position by means of ratchet-wheels 80 81 and pawls 82 83. The hinge of the vertical rudder is not vertical, but slightly inclined upward and toward the back of the balloon, so that if the operating-cables should become stretched or even cut the rudder naturally takes up its position in the axial plane of the balloon. The distance of the rudder arranged at the extremity of the back frame from the body of the balloon is so great that its action is not affected by the air-waves produced by the envelop. The center of the rudder is very nearly in horizontal alinement with the main horizontal plane of the belly, and owing to its being rigidly connected with the strong main framework by means of the light intermediate frame and with the car and the back portion of the envelop by the cables leading to said light frame the rudder exercises its influence on the whole of the balloon.

Propulsion: The propulsion of the airship is effected by two lateral propellers, the positions of which are indicated in Figs. 3 and 4, Figs. 5, 6, 7, and 17 being detail views. The stems 1 of the blades 2 of each propeller are adjustably secured in a cone 3, mounted, by means of a ball-bearing, on an axle 4, about which it can rotate and on which it can slide to a limited extent. The axle 4 is secured to a shaft 4', the extremities of which are journaled in a fork 105, made of steel tubing and secured to a sleeve 106. The latter can rotate on the end of a steel tube 107, secured to the car by a bearing 108. Rotation of the shaft 4 is effected by a sector 109 with helical teeth, worm 110, and a pulley 111, actuated from the car by means of a steel wire 50, passing around pulley 51 on the car. The rotation of the sleeve 106 is obtained in the same way by means of worm 113, wheel 112, and wire 52, passing around pulleys 53' and 54.

It will be seen that by means of the devices described the spindle 4 of the propelling-screw may be given any position corresponding to the various radii of a semisphere.

For the purpose of operating the cone 3 a spindle 114, constituted by a steel tube supported on two ball-bearings and connected by gear-wheels 55 56 with the motor-shaft, (not shown,) passes through the steel tube 107. The spindle 114 carries at its extremity a cone 115 of the same dimensions as the cone 3. The two cones 3 and 115 are in contact with two engaging driving-wheels or cone-surfaces 116 and 117, which are both of the same size, but larger than the cones 3 and 115 and are freely mounted on the cross branch of the T-shaped spindle. The contact of the four cones is insured by springs or elastic cushions 18 and 19.

It will be seen that when the spindle 114 causes the cone 115 to rotate movement is transmitted to the rear cone 3 whatever be the position of the cones 116 and 117 relatively to the front cone 115 and whatever be the position of the rear cone 3 relatively to the cones 116 and 117, or, in other words, whatever be the position of the propelling-screw.

The cones may be of metal, and they may also, or at least some of them, have a friction-surface of leather, compressed paper, or the like, as has the cone 116. (Shown in Fig. 5.) The cones may be replaced by bevel-wheels, in which case the springs become unnecessary. The intermediate toothed wheels may be made of rawhide in order to avoid noise.

The throwing in and out of gear is effected as follows: In the center of the cone 115 is secured, by means of a nut, a steel rod 120, the other end of which is attached to a small cross-bar 121, which can slide in two slots 58, made in that portion of the spindle 114 which projects beyond the bearing 108. The cross-bar 121 is secured to a collar 122. A collar 123, slidable on spindle 114 by means of an operating-lever (not shown) engaging pins 59, carries friction-rollers 160, adapted to bear against and impart movement to collar 122. (See Figs. 5, 6, and 18.) When the part or guide 123 is pulled toward the interior of the car, the spring 19 yields and the cone 115 is brought out of contact with the cones 116 and 117, and the transmission device is thus thrown out of gear. If, on the contrary, the guide is released, the spring 19 throws the transmission device into gear.

Owing to the use of two similar propellers rotating at the same speed in opposite directions and arranged symmetrically relatively to the longitudinal axial plane of the apparatus and in the central plane of the apparatus, or very nearly so, a high propelling efficiency is obtained. These propellers, symmetrical both as regards their position and the direction of rotation, do not produce any rolling effect. Moreover, owing to their lateral position outside all the parts of the apparatus there is no interference with the suction and discharge of the air displaced by them, and no waves are produced affecting their efficiency. A simple tube supports each screw and contains its transmission-gear arranged in front of the plane of the screw at the suction side, where it interferes very little, less than it would interfere if it were on the discharge side.

Owing to the arrangement indicated, the axle of each propeller can be caused to take up any position in the plane normal to the axis of the tube, and in this way the propeller may be used solely for propelling if their spindles are left horizontal or at the same time for propelling and for ascent or descent if they are lowered or raised. In this way waste of gas and ballast and the expenditure of power causing the balloon to move in a vertical direction or in maintaining it at a fixed elevation when the balloon is stationary or traveling at a slow speed are avoided, whereas when the balloon is traveling fairly fast the same result is obtained by shifting the movable aeroplanes or rudders.

The whole of the balloon and the attachment of the car are rendered very strong and rigid by the following means: In describing the fixed aeroplanes mention has already been made of metal frames used in the construction thereof. These metal frames, forming with their canvas the various planes, at the same time afford a means of suspending the car without having to make it larger than is absolutely necessary for the purpose for which it is intended—that is to say, for supporting the motor or motors, the various instruments, and occupants. The car itself is formed as a short pointed elliptical structure, Figs. 1, 3, 4, and 17, and stiffened in the heavy central part intended for the motors by a pointed tube-frame 70, strengthened by ties 71. The strengthening pointed frame in addition prevents the propelling-screws from touching the ground, as it depends below them. Moreover, in case of landing this pointed frame is the first to touch the ground, so that the apparatus thus receives the shock on a strong portion made expressly for the purpose and provided, if desired, with a spring-buffer at its lower end. Between the car and the upper metal frame are arranged ties or steel-cable stretchers. These ties form with the tubes 40, previously described, six sets of connections, arranged in the shape of a fan. (See Fig. 1.) Each of five of the sets is constituted by six cables 72–77, Fig. 3, terminating at the edge and in the center of the frame of the belly, and consequently forming triangles in the direction of their width. In the longitudinal direction the front part of the car is connected to the back of the frame of the belly and the back part of the car to the front of the frame, the whole in triangular construction with the wires of the sets in the shape of a fan. Finally, by the use of the rigid steel tubes 40 the propelling pushing effort is transmitted to the front of the balloon in preference to the transmission being effected by a pull on the back portion. All the cables and tubes are arranged so that the car and the propelling-screws are very near the body of the balloon. A rigid structure is thus formed as long as the balloon is of a buoyancy corresponding to its weight plus that of the metal frames, aeroplanes, &c., whatever be the inclination the air-ship may assume.

A steerable balloon must be capable of being balanced during flight—that is to say, its longitudinal axis must take up a horizontal, or nearly horizontal, position under the resultant of the efforts to which it is submitted. This is a question of calculation and design, and these calculations are facilitated in the balloon according to this invention by the fact that all the efforts are concentrated near the center of the apparatus. Nevertheless, as certain obvious efforts or strains are not known exactly beforehand, and more particularly because the coefficients of the resistance of air for certain forms and kinds of surfaces are not well known, a means must be provided for establishing an equilibrium even during flight. For this purpose at the front and at the back of the frame of the belly, Fig. 1, are arranged two thin and light metal reservoirs $q$ $q'$ of elongated shape and pointed at their ends, in which is placed one of the liquids required for the propulsion of the balloon—such as, for instance, water or petroleum spirit. These two reservoirs are connected by a rigid or flexible tube passing into the car near the aeronaut and provided with two stop-valves $r$ and $r1$ and two drain-cocks $r'$ and $r'1$ and passing through the body of a small centrifugal pump $s$, capable of working in either direction, placed between the two stop-valves. The small centrifugal pump may be driven either by hand or by the motor, as desired, in either direction.

When it is desired to alter the position of equilibrium of the balloon, the small pump is caused to work in the required direction, the two stop-cocks are opened and a more or less large quantity of water or spirit is pumped from the front into the back reservoir, or vice versa, and the stop-valves are then closed. If it is desired to get rid of some of the liquid ballast, the cock $r'$ and the stop-valve corresponding to the reservoir that it is desired partially or entirely to empty are opened.

What is claimed is—

1. In an air-ship, the combination with a balloon, of a main horizontal aeroplane constituting a lower flattened surface of the balloon, a main vertical aeroplane depending from said main horizontal aeroplane, and adjustable horizontal and vertical aeroplanes constituting longitudinal continuations of said main aeroplanes respectively.

2. In an air-ship, a balloon having a flattened under surface or belly constituting a main horizontal aeroplane, a vertical aeroplane or keel extending along and depending from said main horizontal aeroplane throughout approximately the entire length of the latter and a second horizontal or approximately horizontal aeroplane supported from and beneath a projecting end of the balloon and adjustable to different positions or inclinations about an axis at one end of the main horizontal aeroplane.

3. In an air-ship, a balloon having a flattened under surface or belly constituting a main horizontal aeroplane, a vertical aeroplane or keel extending along and depending from said main horizontal aeroplane throughout approximately the entire length of the latter, and other combined approximately horizontal and vertical aeroplanes supported from and depending beneath a projecting end of the balloon and adjustable to different positions or inclinations about an axis at one end of the main horizontal aeroplane.

4. In an air-ship, a balloon having a flattened under surface or belly constituting a main horizontal aeroplane, a vertical aeroplane or keel extending along and depending from said main horizontal aeroplane throughout approximately the entire length of the latter, other combined approximately horizontal and vertical aeroplanes supported from and depending beneath a projecting end of the balloon and adjustable to different positions or inclinations about an axis at one end of the main horizontal aeroplane, and a pivoted vertically-disposed rudder at the outer end of said combined adjustable aeroplanes.

5. In an air-ship, a balloon having a flattened under surface or belly constituting a main horizontal aeroplane, a vertical aeroplane or keel extending along and depending from said main horizontal aeroplane throughout approximately the entire length of the latter, other combined approximately horizontal and vertical aeroplanes supported from and depending beneath a projecting end of the balloon and adjustable to different positions or inclinations about an axis at one end of the main horizontal aeroplane, a pivoted vertically-disposed rudder at the outer end of said combined adjustable aeroplanes, and a horizontally-disposed rudder adjustable to different inclinations on a horizontal axis.

6. In an air-ship, a balloon having a flattened under surface or belly constituting a main horizontal aeroplane, a car suspended beneath said aeroplane, and a sail adapted to be spread in an upwardly-inclined position in the space between the said aeroplane and car to effect the ascent of the air-ship.

7. In an air-ship, a balloon having a flattened under surface or belly constituting a main horizontal aeroplane, a rigid framework constituting a part of said aeroplane, a car suspended beneath the aeroplane, forwardly-inclined rigid connections between said car and framework, and a sail adapted to be spread along said rigid connections.

8. In an air-ship, a balloon having a flattened under surface or belly constituting a main horizontal aeroplane, a rigid framework constituting a part of said aeroplane, a car suspended beneath the aeroplane, propelling mechanism on the car, and forwardly and upwardly extending rigid connections between the car and framework.

9. In an air-ship, a balloon having a flattened under surface or belly constituting a main horizontal aeroplane, a rigid framework constituting a part of said aeroplane, a car suspended beneath the aeroplane, propelling mechanism on the car, forwardly and upwardly extending rigid connections between the car and framework, and a sail adapted to be spread along said rigid connections.

10. In an air-ship, a main balloon having a flattened under surface or belly with ends projecting forwardly and rearwardly beyond said flattened under surface, a car suspended beneath the flattened under surface of the balloon, propelling mechanism and a motor on the car, and an auxiliary balloon or chamber charged with non-inflammable gas and extending upwardly within the main balloon and continuously over the flattened under surface thereof above the car.

11. In an air-ship, a balloon having a flattened under surface or belly constituting a main horizontal aeroplane and tapering ends extending beyond said aeroplane, a rigid frame constituting part of said aeroplane, combined horizontal and vertical aeroplanes adjustable about a horizontal axis at one end of the main horizontal aeroplane and comprising a rigid frame, a car suspended beneath the main horizontal aeroplane, and connections from the framework of the combined horizontal and vertical aeroplanes upward to the tapered end of the balloon and from said framework to the car.

12. In an air-ship, the combination with a car, of a propeller, an axle on which said propeller is rotatably mounted, a shaft to which the axle is secured, a support in which the shaft is journaled, means for turning the support and for rotating the shaft in said support to move the propeller to any desired position, and driving connections rotating the propeller on its axle from a motor on the car whatever the position of the parts.

13. In an air-ship, the combination with a car, of a propeller, a bifurcated support, a shaft journaled in the arms of said support, an axle secured to the shaft and on which the propeller is rotatably mounted, two driving-wheels rotatable on said shaft on opposite sides of said axle, a wheel on the propeller engaged between said driving-wheels, means for rotating the shaft and for turning the support to bring the propeller to any desired position, and connections for imparting motion from a motor on the car to the driving-wheels whatever the position of the parts.

In testimony whereof we have signed this specification in the presence of two subscribing witnesses.

PAUL LEBAUDY.
PIERRE LEBAUDY.

Witnesses:
EMILE LEOBEL,
AUGUSTUS E. INGRAM,